3,046,268
CATALYTIC PROCESS FOR POLYMERIZING ETHYLENICALLY UNSATURATED HYDROCARBONS
Howard J. Cohen, Cincinnati, Ohio, assignor to National Distillers and Chemical Corporation, New York, N.Y., a corporation of Virginia
No Drawing. Filed Sept. 22, 1959, Ser. No. 841,448
9 Claims. (Cl. 260—94.9)

The present invention relates to an improved polymerization process and, particularly, to such a process utilizing a novel catalyst system for polymerizing olefins to high molecular weight polymers. Still more particularly, the invention relates to such a process using a catalyst system that is advantageously soluble in conventional reaction media employed for polymerizing olefins and is highly stable against objectionable hydrolysis and thermal decomposition.

In the process embodied herein, the catalyst system comprises (1) a suitable reducing agent and (2) a compound of the formula $$M'(R_1R_2R_3MO)_y$$

wherein M′ is a metal from groups IVb, Vb and VIb of the periodic table, such as $Ti^{+2}$ to $^{+4}$, $Zr^{+2}$ to $^{+4}$, $Hf^{+2}$ to $^{+4}$, $V^{+2}$ to $^{+5}$, $Nb^{+2}$ to $^{+5}$, and $Ta^{+2}$ to $^{+5}$, M is selected from the group consisting of Si, Ge, Sn and Pb, y is the valence of the metal M′, and $R_1$, $R_2$ and $R_3$ is a hydrocarbon radical, e.g., alkyl, aralkyl, aryl, cycloalkyl, etc., and preferably an alkyl radical such as one containing from one to eight carbon atoms and specifically, methyl, ethyl, n-propyl, isopropyl, n-butyl, sec-butyl, isobutyl, t-butyl, n-amyl, isoamyl, n-hexyl, n-octyl, 2-ethylhexyl, etc., and aryl radicals such as phenyl, p-tolyl, and the like. Specific compounds falling within the scope of the aforesaid structural formula include tetrakis(trimethylsiloxy) titanium, $Ti[OSi(CH_3)_3]_4$, tetrakis(trimethylsiloxy)-zirconium, tetrakis(triphenylsiloxy) vanadium, pentakis(trimethylsiloxy) tantalum, tetrakis(triphenylstannoxy) titanium, $Ti[OSn(C_6H_5)_3]_4$, and others.

Compounds, other than the reducing agent, embodied for use as a catalyst component may, for example, be prepared by the method of English and Sommer, J.A.C.S. 77, 170 (1955), and illustrated by preparation of tetrakis-(trimethylsiloxy)titanium by reacting trimethylsilanol with titanium tetrachloride; by the method of Zeitler and Brown, J.A.C.S. 79, 4616 (1957) showing preparation of tetrakis (triphenylsiloxy) titanium by reacting triphenylsilanol with tetrabutoxytitanium; and still other compounds, such as those in which M′ is vanadium may be prepared by reacting an appropriate alkali metal triorganosilanolate or stannolate with, for example, vanadium tetrahalide in accordance with the procedure of Tatlock and Rochow, J. Am. Chem. Soc. 77, 170 (1955), and, for example, the reaction of sodium triphenylsilanol or sodium trimethylsilanol with vanadium tetrachloride to prepare, respectively, tetrakis-(triphenylsiloxy) vanadium and tetrakis-(trimethylsiloxy) vanadium.

In reference to the reducing agent that is one component of the catalyst system embodied herein, particularly suitable and preferred are the alkylaluminum halides, such as dialkylaluminum halides, alkylaluminum dihalides, and mixtures thereof generally called "alkylaluminum sesquihalides." Thus, embodied for use herein are ethylaluminum sesquibromide, ethylaluminum sesquichloride, methylaluminum dibromide, dimethylaluminum bromide, methylaluminum dichloride, dimethylaluminum chloride, butylaluminum dibromide, dibutyl aluminum chloride, hexylaluminum dibromide, dihexylaluminum bromide, and similar alkylaluminum halides and mixtures thereof. Still other reducing agents embodied for use herein are strong reducing agents such as alkali metals (e.g., sodium), alkaline earth metals (e.g., magnesium, calcium), organoalkali compounds (e.g., alkylsodium), organometallic compounds (e.g., trialkylaluminum), and the like with further specific examples including tripropylaluminum, triisobutylaluminum, tri-n-decylaluminum, butyl magnesium chloride, dibutyl magnesium, metal hydrides such as lithium hydride, magnesium hydride, etc.

Reaction conditions at which the polymerization may be carried out with the novel catalyst system include the following:

| | |
|---|---|
| Temperature | From −120° C. to 300° C., preferably 50 to 250° C. |
| Pressure | Subatmospheric to 3000 atmospheres, preferably atmospheric to 200 atmospheres. |
| Ratio of catalyst components (mol ratio of reducing agent: M-containing compound) | 0.1 to 50 : 1, preferably 1 to 20 : 1. |
| Total catalyst concentration (based on weight of monomer to be polymerized) | 0.005 to 10%. |

The compounds which may be polymerized according to the present invention consist generally of hydrocarbons, such as the olefins containing 2 to 16 carbon atoms. Specific examples of such hydrocarbons include ethylene, propylene, butene-1, pentene-1, hexene-1, 4-methyl-pentene-1, butadiene, isoprene, styrene, methylstyrene, etc. Mixtures thereof, as for example mixtures of ethylene and butene-1, may be used for copolymerization with the catalyst system embodied herein.

The polymerization reaction is carried out in batch, semi-continuous or continuous operation. Most conveniently, and in preferred embodiments, the process at lower temperature operations is carried out in a diluent or liquid reaction medium, the amount not being unduly critical but it should be at least sufficient to permit effective agitation and preferably to hold the major portion of the polymer in solution.

Suitable organic media include aliphatic alkanes or cycloalkanes such as pentane, hexane, heptane, cyclohexanes; hydrogenated aromatics such as tetrahydronaphthalene, high molecular weight liquid paraffins which are liquid at the reaction temperature; aromatics such as benzene, toluene, xylene, halogenated aromatics such as chlorobenzene, chloronaphthalene, etc. Other reaction media include ethylbenzene, isopropylbenzene, ethyltoluene, n-propyl benzene, diethylbenzenes, mono- and dialkyl naphthalene, n-pentane, n-octane, isooctane, methylcyclohexane, tetralin, decalin, and other inert liquid hydrocarbons. In carrying out the polymerization reaction at relatively high pressures, such as at one thousand atmospheres and above, it may be carried out in the absence or substantial absence of such reaction media and, in such instance, the need for solvent recovery systems, etc., may be obviated.

It is preferred that the reaction medium that is used be essentially free of impurities which may react to destroy catalyst activity or which copolymerize with the olefinic hydrocarbon; that is, appreciable quantities of material such as carbon dioxide, oxygen and acetylenic compounds should preferably be absent.

For this process, the polymerizable hydrocarbons may be used in substantially pure form or there may be used a mixture containing major quantities thereof, provided no impurities are present in substantial amounts to destroy the catalyst and/or contaminate the polymer product. For instance, ethylene obtained by the cracking of hydrocarbon streams is satisfactory if acetylenic and oxygenated materials are not present in more than trace amounts.

In carrying out the herein described polymerization process, it is preferable and highly desirable to maintain the polymerization zone free of extraneous gases. This can be done by keeping the reaction blanketed at all times with an inert gas, for example, operating with an inert gas such as nitrogen, argon or helium. Preferably, the reactor and its contents are blanketed with the polymerizable substance, e.g., ethylene gas, to avoid unnecessary dilution of the reactor contents with the inert gases.

In order to further describe the invention, the following examples set forth specific embodiments of catalyst systems embodied herein for polymerizing ethylene to high molecular weight polymers. For the examples set forth, the reducing agent component of the catalyst system was ethyl aluminum sesquichloride (a 1:1 mixture of $Al(C_2H_5)Cl_2$ and $(Al(C_2H_5)_2Cl)$ or diethyl aluminum chloride and the other component was $Ti[OSi(CH_3)_3]_4$, $V[OSi(C_6H_5)_3]_4$ or $Ti[OSi(C_6H_5)_3]_4$.

In each of the examples, the polymerization was carried out in a three-necked glass reaction flask equipped with a high speed stirrer, thermometer, mercury manometer for reading reactor pressure, and feed lines supplying purified ethylene and decahydronaphthalene. The ethylene was supplied through a pressure reducing valve on a demand basis during the polymerization to maintain a constant ethylene pressure in the reactor (60 mm. Hg gauge). The amount of ethylene absorbed was determined from the pressure drop observed at constant temperature in a supply tank of known volume.

Example 1

With 160 ml. of decahydronaphthalene (heated to 125° C.) in a 250 ml. reactor, a 0.1 M solution (in decahydronaphthalene) of the ethylaluminum sesquichloride was added in amount sufficient to provide the concentration shown for each run in the following tabulation and, after an elapse of 1½ minutes, a 0.1 M solution of tetrakis(trimethylsiloxy) titanium was added to provide the amount thereof shown for each run. After such addition of catalyst components, the polymerization was conducted at an ethylene pressure of 60 mm. Hg. gauge, at 125° C. for 20 minutes, whereupon the viscous solution of the polymeric product was withdrawn from the reactor and diluted with an equal volume of acetone. The solid polymer was collected by filtration, boiled 10 minutes in each of three successive portions of a solution of one part by volume of concentrated HCl and two parts by volume of isopropyl alcohol, then boiled 10 minutes in each of three portions of isopropyl alcohol, washed with acetone, and dried in a vacuum oven at 120° C. to constant weight.

Example 2

In another run, the polymerization of ethylene was carried out using $V[OSi(C_6H_5)_3]_4$ and diethylaluminum chloride as the combination catalyst. In such a run, 500 ml. of preheated decalin was charged to the reactor and the temperature adjusted to 125° C. The reactor contents, 2.1 ml. of a 0.133 M. decalin solution of $(C_2H_5)_2AlCl$ was added followed by 0.085 millimole of $V[OSi(C_6H_5)_3]_4$ dissolved in 9.0 ml. of decalin. After 30 minutes of reaction at an ethylene pressure maintained at 60 mm. Hg gauge, 2.57 grams of ethylene was absorbed. The product was isolated and purified as described in Example 1 to yield 2.61 grams of a tough, white polymer.

The following tabulation sets forth additional data pertaining to the run of Example 2.

| Run No. | $(C_2H_5)_2AlCl$ millimole | Al/V Atomic Ratio | Amount of $C_2H_4$ absorbed in 30 min. grams | Gram-moles of ethylene absorbed per gram-mole of total $(C_2H_5)_2AlCl + V[OSi(C_6H_5)_3]_4$ | Amount of Polymer isolated, grams | Appearance of polymeric product |
|---|---|---|---|---|---|---|
| 7 | 0.28 | 3.3 | 2.57 | 250 | 2.61 | tough, white solid. |

Example 3

In another run, ethylene was polymerized using a catalyst combination of $Ti[OSi(C_6H_5)_3]_4$ and triethylaluminum. In such a run, 300 ml. of decalin was introduced into a one liter stirred pressure autoclave previously flushed with pure nitrogen. The contents of the flask were then heated to 180° C. under nitrogen and, after releasing the pressure in the autoclave, 5.72 grams (0.005 mole) of $Ti[OSi(C_6H_5)_3]_4$ dispersed in 20 ml. of decalin was added, followed by addition of 13 ml. of a 0.5 M solution of triethylaluminum (0.74 gram, 0.0065 mole). The autoclave was pressured to 500 p.s.i.g. with ethylene and the polymerization carried out for one hour and ten minutes, the autoclave being repressured to 500 p.s.i.g. each time it fell to 400 p.s.i.g. The temperature of the polymerization reaction ranged from 146–184° C. At the end of the polymerization reaction, the viscous reaction product was discharged from the autoclave into an excess of water. The solid product, when cool, was collected and treated with heptane in a mechanical blender to remove decalin, again collected, treated twice with acetone in the blender, and finally collected and dried at 95° C. under vacuum. The dried polymeric product obtained weighed 8.2 grams, corresponding to a yield of 25 moles of polyethylene per mole of total catalyst.

While there are above disclosed but a limited number of embodiments of the process of the invention herein presented, it is possible to produce still other embodiments without departing from the inventive concept herein disclosed, and it is desired therefore that only such

| Run No. | Ethylaluminum sesquichloride (millimoles) | $Ti[OSi(CH_3)_3]_4$ (millimoles) | Al/Ti Atomic Ratio | $C_2H_4$ absorption after 20 minutes gram moles per gram mol of total catalyst | Properties of Isolated Polymer | | |
|---|---|---|---|---|---|---|---|
| | | | | | Relative Viscosity [1] | Density, grams/cc.[2] | Softening Point, ° C.[3] |
| 1 | 0.193 | 0.035 | 11.0 | 190 | 1.551 | 0.9545 | 140 |
| 2 | 0.158 | 0.017 | 18.0 | 120 | | | |
| 3 | 0.123 | 0.017 | 14.0 | 125 | | | |
| 4 | 0.101 | 0.017 | 11.8 | 154 | | | |
| 5 | 0.16 | 0.035 | 9.1 | 126 | 1.458 | 0.9680 | 143 |
| 6 | 0.208 | 0.035 | 11.9 | 218 | | | |

[1] Relative viscosity of a 0.1 weight percent solution in decahydronaphthalene at 130° C.
[2] ASTM D-1238.
[3] Under compression at 66 p.s.i.

limitations be imposed on the appended claims as are stated therein.

What is claimed is:

1. A polymerization process which comprises contacting a lower molecular weight ethylenically unsaturated hydrocarbon with a combination catalyst comprising (1) a reducing agent from the group consisting of trialkylaluminum and alkylaluminum halides and (2) a compound of the formula $$M'(R_1R_2R_3MO)_y$$

wherein M' is a metal from groups IVb and Vb of the periodic table, M is a member from the group consisting of Si and Sn, y is the valence of M', and $R_1$, $R_2$ and $R_3$ is a hydrocarbon radical to produce a normally solid polymer of said unsaturated hydrocarbon.

2. A process, as defined in claim 1, wherein M' is a member from the group consisting of tetravalent vanadium and tetravalent titanium and M is silicon.

3. A process, as defined in claim 1, wherein the reducing agent is an alkyl aluminum halide.

4. A process, as defined in claim 1, wherein $R_1$, $R_2$ and $R_3$ is methyl.

5. A process, as defined in claim 1, wherein $R_1$, $R_2$ and $R_3$ is phenyl.

6. A polymerization process which comprises contacting a lower molecular weight monoolefinic hydrocarbon at from −120° to 300° C. with from about 0.005 to about 10%, based on the weight of the monoolefinic hydrocarbon, of a combination catalyst comprising (1) a reducing agent from the group consisting of trialkylaluminum and alkylaluminum halides and (2) a compound of the formula $$M'(R_1R_2R_3MO)_y$$

wherein M' is a metal from groups IVb and Vb of the periodic table, M is a member from the group consisting of Si, Sn, y is the valence of M' and $R_1$, $R_2$ and $R_3$ is a hydrocarbon radical in which the mole ratio of the reducing agent to said compound is 0.1 to 50:1 to produce a normally solid polymer of said monoolefinic hydrocarbon.

7. A process, as defined in claim 6, wherein the monoolefinic hydrocarbon is ethylene.

8. A process, as defined in claim 6, wherein the polymerization reaction is carried out in presence of an inert liquid reaction medium.

9. A process, as defined in claim 6, wherein the compound is from the group consisting of $Ti[OSi(CH_3)_3]_4$, $V[OSi(C_6H_5)_3]_4$ and $Ti(OSi(C_6H_5)_3]_4$.

References Cited in the file of this patent

UNITED STATES PATENTS 2,938,000    Wanless _____ May 24, 1960

FOREIGN PATENTS 534,792    Belgium _____ Jan. 31, 1955

OTHER REFERENCES

English et al.: J. Am. Chem. Soc. 77, January 5, 1955, p. 170.